Patented Aug. 17, 1948

2,447,020

UNITED STATES PATENT OFFICE 2,447,020

PREPARATION OF DIAMINOPHENOL

John Krueger and Robert Lenhart Hayes, Chicago, Ill., assignors to The Edwal Laboratories, Inc., Chicago, Ill., a corporation of Illinois No Drawing. Application December 8, 1943, Serial No. 513,463

11 Claims. (Cl. 260—575)

Our invention relates to the preparation of diaminophenol

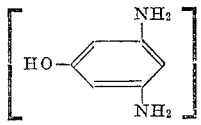

and is particularly concerned with a new and useful and highly efficacious method for the production thereof.

We have found, in accordance with our present invention, that symmetrical triaminobenzene hydrochlorides, produced as described in the German patent to Cassella, No. 102,358; in Ann. 215, 348 (1882); Monatsh. 18, 760 (1897) and Monatsh. 22, 984 (1901), or produced in any other manner, may be converted by step-wise hydrolysis into diaminophenol hydrochlorides and the latter may be treated, as hereinafter described, to produce the diaminophenol base. The latter may be recovered as a crystalline material which, in the pure form, is present as white needles melting at approximately 180 degrees C. Diaminophenol base has utility in the preparation of pharmaceuticals; as dye and resin intermediates; as anti-oxidants for oleaginous materials, rubber, and the like; and as an intermediate for the synthesis of various organic compounds.

In general, in its preferred embodiment, our method comprises hydrolyzing a symmetrical triaminobenzene hydrochloride (which may be a monohydrochloride, a dihydrochloride, a trihydrochloride, or mixtures thereof, or the hydrates of such hydrochlorides) in an aqueous medium at somewhat elevated temperatures, particularly at approximately the boiling point of the solution and preferably not less than about 60 degrees C. In its particularly preferred embodiment, the hydrolysis is conducted in an aqueous weakly acid medium. We prefer to operate at a pH not exceeding 2 and, for best results, the pH should be below 1. While acids generally may be used, we prefer particularly to employ hydrochloric acid and, for best results, it should be used in approximately 3% to 8% solution, preferably approximately 5%.

After the hydrolysis has been completed to the extent desired, which, as indicated hereinabove, results in the conversion of only one of the amino groups of the triaminobenzene to an hydroxy group, the hydrolysate is cooled, for example, to room temperature or slightly below, and hydrochloric acid is added thereto, preferably in the form of gaseous hydrochloric acid, sufficient hydrochloric acid being added to precipitate the diaminophenol in the form of its dihydrochloride salt.

The resulting precipitate of diaminophenol dihydrochloride, after separation by filtration or the like, is then treated to recover the free diaminophenol base. This is very effectively accomplished by admixing the diaminophenol dihydrochloride with a strong aqueous solution of an alkali carbonate. The resulting precipitate, which contains the free diaminophenol base, may be extracted with an organic solvent, for example, methanol, acetone, or the like. The free diaminophenol base may then be recovered from the organic solvent by crystallization or by evaporation of the solvent. In place of the alkali carbonates, alkalies or alkaline materials generally may be utilized, but we have found that the alkali carbonates, particularly the alkali metal carbonates, and especially sodium carbonate, are unusually satisfactory and we make particular claim to the use thereof as an important, though limited, embodiment of our invention.

In order that those skilled in the art may more fully understand the nature of the present invention, the following example is set forth as illustrative. It will be understood that the proportions of reacting ingredients, times of reaction, and the like, may be varied. These and other variations and modifications will be evident to those skilled in the art in the light of the guiding principles which are disclosed herein.

Example 200 grams of symmetrical triaminobenzene trihydrochloride monohydrate were added to 1 liter of 5% hydrochloric acid and the mixture was boiled for fifteen minutes. Then 1 liter of concentrated hydrochloric acid was added and the solution was chilled to zero degrees C. The precipitate (100 grams) of diaminophenol dihydrochloride was filtered off.

The diaminophenol dihydrochloride was added to 700 cc. of warm 20% sodium carbonate solution. The precipitate which resulted was filtered off and was boiled in 600 cc. of water containing 10 grams of activated charcoal and 1 gram of sodium hydrosulfite. The boiling solution was filtered and the filtrate was chilled to 10 degrees C. 50 grams of white diaminophenol base appeared and were filtered off. Diaminophenol base crystallized from methanol as fine white needles of M. P. 180 degrees.

Anal. Calcd. for $C_6H_8ON_2$: C, 58.05; H, 6.50; N, 22.57.

Found: C, 58.1; H, 6.3; N, 22.1.

While we have described our invention in detail it will be understood that scope thereof is not to be limited other than as set forth in the claims.

What we claim as new and desire to protect by Letters Patent of the United States is:

1. In a method of preparing diaminophenol base, the steps which comprise hydrolyzing a hydrochloride of symmetrical triaminobenzene with an aqueous-hydrochloric acid solution until only one of the amino groups of the triaminobenzene is converted to a hydroxy group, cooling, adding hydrochloric acid thereto and filtering off the resulting precipitate, admixing said precipitate with a solution of an alkali metal carbonate, filtering off the resulting precipitate and extracting the diaminophenol therefrom with an organic solvent.

2. In a method of preparing diaminophenol base, the steps which comprise hydrolyzing a hydrochloride of symmetrical triaminobenzene with an approximately 5% aqueous-hydrochloric acid solution until only one of the amino groups of the triaminobenzene is converted to a hydroxy group, cooling, adding hydrochloric acid thereto and filtering off the resulting precipitate, adding it to a solution of sodium carbonate, and filtering off the resulting precipitate.

3. In a method of preparing diaminophenol base, the steps which comprise hydrolyzing a hydrochloride of symmetrical triaminobenzene with an aqueous acid solution until only one of the amino groups of the triaminobenzene is converted to a hydroxy group, cooling, adding hydrochloric acid thereto and filtering off the resulting precipitate, admixing said precipitate with a solution of an alkali metal carbonate, and filtering off the resulting precipitate.

4. In a method of preparing diaminophenol base, the steps which comprise hydrolyzing a hydrochloride of symmetrical triaminobenzene in an aqueous medium until only one of the amino groups of the triaminobenzene is converted to a hydroxy group, cooling, adding hydrochloric acid thereto and filtering off the resulting precipitate, adding it to an approximately 20% solution of an alkali metal carbonate, and filtering off the resulting precipitate.

5. In a method of preparing diaminophenol, the steps which comprise hydrolyzing a hydrochloride of symmetrical triaminobenzene with an acid medium at a pH not exceeding about 2 until only one of the amino groups of the triaminobenzene is converted to a hydroxy group, cooling, adding hydrochloric acid thereto and filtering off the resulting precipitate, adding it to a solution of an alkali metal carbonate, filtering off the resulting precipitate and extracting the diaminophenol therefrom with an organic solvent.

6. In a method of preparing diaminophenol base, the steps which comprise hydrolyzing a hydrochloride of symmetrical triaminobenzene with an aqueous acid solution until only one of the amino groups of the triaminobenzene is converted to a hydroxy group, cooling, adding hydrochloric acid thereto and filtering off the resulting precipitate, and adding it to an alkali to free the diaminophenol base.

7. In a method of preparing diaminophenol base, the steps which comprise hydrolyzing a hydrochloride of symmetrical triaminobenzene in an aqueous medium until only one of the amino groups of the triaminobenzene is converted to a hydroxy group, cooling, adding hydrochloric acid thereto and filtering off the resulting precipitate, and admixing said precipitate with an alkali to free the diaminophenol base.

8. In a method of preparing diaminophenol, the steps which comprise hydrolyzing a hydrochloride of symmetrical triaminobenzene in an aqueous medium at a temperature between about 60 degrees C. and the boiling point until only one of the amino groups of the triaminobenzene is converted to a hydroxy group, and then cooling the hydrolysate.

9. In a method of preparing diaminophenol, the steps which comprise hydrolyzing a hydrochloride of symmetrical triaminobenzene with a weak aqueous acid solution until only one of the amino groups of the triaminobenzene is converted to a hydroxy group, cooling, adding hydrochloric acid thereto and filtering off the resulting precipitate, adding it to an alkali to form a precipitate containing diaminophenol, filtering off the resulting precipitate, and extracting the diaminophenol therefrom with an organic solvent.

10. In a method of preparing diaminophenol, the steps which comprise hydrolyzing a hydrochloride of symmetrical triaminobenzene in an aqueous acid medium having a pH not exceeding about 2 and at a temperature between 60 degrees C. and the boiling point until only one of the amino groups of the triaminobenzene is converted to a hydroxy group, and then cooling the hydrolysate.

11. In a method of producing substantially pure diaminophenol base from crude diaminophenol base, the steps which comprise dissolving the crude diaminophenol base in boiling water in the presence of activated carbon and sodium hydrosulfite solution, filtering, and recovering substantially pure, white diaminophenol base from the filtrate.

JOHN KRUEGER.
ROBERT LENHART HAYES.

REFERENCES CITED

The following references are of record in the file of this patent:

UNITED STATES PATENTS

| Number | Name | Date |
|---|---|---|
| 1,492,094 | Bielouss | Apr. 29, 1924 |

FOREIGN PATENTS

| Number | Country | Date |
|---|---|---|
| 166,934 | Great Britain | July 25, 1921 |

OTHER REFERENCES

Organic Syntheses, Gilman and Blatt (1941), vol. I, pages 50 and 456.